(12) United States Patent
Amma

(10) Patent No.: US 8,406,589 B2
(45) Date of Patent: Mar. 26, 2013

(54) METHOD OF MAKING A FIBER OPTICAL CABLE ASSEMBLY

(75) Inventor: Achim Amma, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 279 days.

(21) Appl. No.: 12/693,500

(22) Filed: Jan. 26, 2010

(65) Prior Publication Data

US 2011/0182553 A1    Jul. 28, 2011

(51) Int. Cl.
*G02B 6/44* (2006.01)
*B29D 11/00* (2006.01)

(52) U.S. Cl. ........ 385/100; 264/1.28; 428/375; 428/378

(58) Field of Classification Search .......... 385/101–104, 385/113, 100; 428/364, 372, 373, 375, 379, 428/383, 389, 395, 378; 264/1.28
See application file for complete search history.

(56) References Cited

U.S. PATENT DOCUMENTS

| | | | |
|---|---|---|---|
| 5,047,456 A * | 9/1991 | Onwumere et al. | 524/13 |
| 5,270,113 A | 12/1993 | Rebouillat | |
| 5,389,442 A * | 2/1995 | Arroyo et al. | 428/396 |
| 6,319,558 B1 | 11/2001 | Willemsen | |
| 6,454,003 B1 | 9/2002 | Chang et al. | |
| 6,500,541 B1 | 12/2002 | Schoeck, Jr. et al. | |
| 6,891,003 B2 | 5/2005 | Rebouillat | |
| 6,898,354 B2 * | 5/2005 | Kim et al. | 385/100 |

OTHER PUBLICATIONS

Search Report, Apr. 21, 2011, PCT/US2011/02366.
Brian K. Long, B. Keith Keitz and C. Grant Wilson, Materials for step and flash imprint lithography, Journal of materials Chemistry, Sep. 14, 2007, p. 3565-3656, vol. 17 No. 34.

* cited by examiner

*Primary Examiner* — Uyen Chau N Le
*Assistant Examiner* — Michael Mooney

(57) ABSTRACT

A process for forming a fiber optical cable assembly comprises the steps of (a) subjecting a first high tenacity reinforcement yarn such as para-aramid that is coated with a water-impermeable thermally reversible cross-linked polymeric coating to a temperature of from 45 to 200 ° C. for sufficient time to convert the protective coating via bond cleavage into a water-swellable super absorbent polymer, (b) combining one or more of the first reinforcement yarns from step (a) with one or more optical glass fiber transmission media and (c) applying a protective sleeve over at least one assembly of step (b).

8 Claims, No Drawings

METHOD OF MAKING A FIBER OPTICAL CABLE ASSEMBLY

BACKGROUND OF THE INVENTION

1. Field of the Invention

This invention pertains to a method for treating high tenacity fibers such as aramids and their use in fiber optical cable assemblies.

2. Description of the Related Art

Para-aramid yarns are known for their use as reinforcement for optical communications cables. The optical cable and reinforcement yarn along with other components are enclosed in a sleeve. It is desirable to prevent water from getting inside the sleeve and causing deterioration of the encased components. There is an ongoing need to provide solutions to the problem of preventing water ingress into optical cable systems.

U.S. Pat. No. 6,319,558 to Willemsen describes a process for the manufacture of a yarn provided with a superabsorbent material having a swelling value of at least 60 and having hydrophilic properties which is capable of absorbing and retaining quantities of water, wherein the process includes applying an aqueous solution of a water-soluble pre-superabsorbent material onto the yarn followed by drying and heating of the yarn in order to cross-link or to polymerize the water-soluble pre-superabsorbent material to the superabsorbent material.

U.S. Pat. No. 6,500,541 to Schoeck et al describes synthetic polymeric filaments containing super absorbent polymer (SAP) particles adhered to the filament surfaces by a nylon binder which is soluble in alcohols. Such SAP-coated filaments may then be incorporated into telecommunications cables as a component part thereof to achieve enhanced water-blocking functions.

U.S. Pat. No. 6,454,003 to Chang et al addresses a composition comprising expandable cross linked polymeric microparticles having an unexpanded volume average particle size diameter of from about 0.05 to about 10 microns and a cross linking agent content of from about 9,000 to about 200,000 ppm of labile cross linkers and from 0 to about 300 ppm of non-labile cross linkers.

An article by Long and colleagues in the Journal of Materials Chemistry, Volume 17, Number 34, Pages 3575-3580 discusses thermally reversible cross-linked polymeric materials for use in imprint lithography.

SUMMARY OF THE INVENTION

This invention relates to a process for forming a fiber optical cable assembly comprising the steps of:

(a) subjecting a first reinforcement yarn having a linear density of from 150 to 12000 dtex, a tenacity of from 10 to 65 g/dtex, a modulus of from 150 to 2700 g/dtex, and an elongation to break of from 1 to 8 percent coated with a water-impermeable thermally reversible cross-linked polymeric coating to a temperature of from 45 to 200° C. for sufficient time to convert the protective coating via bond cleavage into a water-swellable super absorbent polymer.

(b) combining one or more of the first reinforcement yarns from step (a) with one or more optical glass fiber transmission media and (c) applying a protective sleeve over at least one assembly of step (b).

DETAILED DESCRIPTION

First Reinforcement Yarns

For purposes herein, the term "fiber" is defined as a relatively flexible, macroscopically homogeneous body having a high ratio of length to width across its cross-sectional area perpendicular to its length. The fiber cross section can be any shape, but is typically circular. Herein, the term "filament" is used interchangeably with the term "fiber". The fibers can be any length. The fibers can be continuous filaments which are filaments that extend typically for a meter or much longer. Filaments are spun in a continuous form frequently as part of a multifilament yarn, wound onto a spool and then cut after the desired amount is placed on the spool.

Suitable first reinforcement yarns for this invention have a linear density of from 150 to 12000 dtex, a tenacity of from 10 to 65 g/dtex, a modulus of from 150 to 2700 g/dtex, and an elongation to break of from 1 to 8 percent. Suitable polymeric materials for the first reinforcement yarn filaments include polyamide, polyazole and mixtures thereof.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968.

A preferred aramid is a para-aramid. A preferred para-aramid is poly(p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Polyazoles are also suitable polymers for the first reinforcement yarns of this invention. In some preferred embodiments the polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having first reinforcement yarn tenacities of 30 gpd or greater. If the polybenzazole is a polybenzothioazole, preferably it is poly(p-phenylene benzobisthiazole). If the polybenzazole is a polybenzoxazole, preferably it is poly(p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having first reinforcement yarn tenacities of 30 gpd or greater. In some embodiments, the preferred polypyridazole is a polypyridobisazole. A preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

First reinforcement yarns comprising a mixture of polyamide and polyazole filaments may also be utilized in this invention.

Coatings for the First Reinforcement Yarn

The coating is a cross-linked polymer. As used herein, the coating applied to the first reinforcement yarn serves two functions. Initially the coating acts as a handling aid to prevent wear on the first reinforcement yarn during its manufacture, storage and initial assembly with the optical cable components. The second function is that the coating serves as a precursor for a swellable polymeric coating that, when exposed to moisture inside the cable sleeve, will expand to provide a moisture barrier. Such a material is also known as a superabsorbent material. This second functionality is achieved by, prior to marrying the coated first reinforcement yarn with the optical cable, subjecting the coated first reinforcement yarn to a temperature sufficient to cause thermal cleavage of the cross-linked polymeric coating on the yarn.

Suitable coating materials are blocked isocyanates, Diels-Alder reaction products, azo-group containing molecules or mixtures thereof. A preferred Diels-Alder reaction product is that between substituted furans and maleimides. An example of a Diels-Alder product is that formed from the reaction between furfural alcohol and a hydroxyethyl-functionalized maleimide that has been further functionalized with pendant acrylates or methacrylates to provide a cross-linked structure In one embodiment, the thermally reversible cross-linkers of the thermally reversible coating are present in an amount of from 0.001% to 1.5% weight percent based on the total weight of first reinforcement yarn plus coating. The cross-linkers can be present at an amount of from 0.01% to 1.0% or even from 0.1% to 0.5%. The thermally reversible cross-linked coating is present in the amount of from 0.1% to 20% weight percent based on the total weight of the first reinforcement yarn plus coating. The coating can be present at an amount of from 1% to 15% or even from 2% to 8%. By thermally reversible cross-linkers we mean a compound containing a covalent bond that is capable of bond cleavage under heat.

The coating may be applied to the first reinforcement yarn via immersion of the first reinforcement yarn in a bath of monomer followed by polymerization of the monomer in a heated environment. In an alternative process, the coating may be pre-polymerized and a dispersion or slurry containing polymerized coating in an aqueous or oil based medium may be prepared. Preferably, an aqueous medium is used. The slurry contains about 40% solids. The first reinforcement yarn is immersed in the polymeric dispersion and then passed through a drying unit to reduce volatiles to the desired level. The volatile content after drying is no greater than 10%, or less than 7% or even less than 5%. The temperature in the drying unit should be less than the bond cleavage temperature of the cross linked coating polymer such as at least 10 degrees C. or even at least 15 degrees C.

Optical Glass Fiber Transmission Media

This is also known as a wave guide. Any commercially available wave guide may be used with this invention.

Second Reinforcement Yarn and Outer Sleeve

In some embodiments, a second reinforcement yarn is combined with the first reinforcement yarns and glass fiber transmission media. A common material for the second reinforcement yarn is glass fiber such as E-glass or S-glass. Both of these materials are available in yarn or roving forms. E-Glass is a commercially available low alkali glass. One typical E-Glass composition consists of 54 weight % $SiO_2$, 14 weight % $Al_2O_3$, 22 weight % CaO/MgO, 10 weight % $B_2O_3$ and less then 2 weight % $Na_2O/K_2O$, Some other materials may also be present at impurity levels. S-Glass is a commercially available magnesia-alumina-silicate glass. One typical S-Glass composition consists of 65 weight % $SiO_2$, 25 weight % $Al_2O_3$ and 10 weight % MgO. Some other materials may also be present at impurity levels. This composition is stiffer, stronger and more expensive than E-glass.

The outer sleeve is polymeric. Polyethylene is a preferred material for the sleeve.

Process

A fiber optic cable assembly having water blocking capability is prepared by the steps of:

(a) subjecting a first reinforcement yarn coated with a water-impermeable thermally reversible cross-linked polymeric coating to a temperature of from 45 to 200° C. for sufficient time to convert the protective coating via bond cleavage into a water-swellable super absorbent polymer.

(b) combining one or more of the first reinforcement yarns from step (a) with one or more optical glass fiber transmission media and (c) applying a protective sleeve over at least one assembly of step (b).

In step (a), preferably at least 60% of the cross-linked bonds are broken, more preferably at least 75% and most preferably at least 90%. The temperature dwell time in step (a) will vary for different coating materials and for the relative amount of coating on the first reinforcement yarn.

The first reinforcement yarns and wave guide cable are combined in step (b) either by placing them side by side or the reinforcement yarn is wound in a spiral around the waveguide. More than one waveguide may be used in the assembly. In an optional feature, a plurality of waveguides or reinforcement yarns may themselves be formed into a spiral configuration.

The numbers of first reinforcement yarns and wave guides combined in one assembly may vary depending on particular design needs. For example, several first reinforcement yarns can surround one wave guide and in other cases several wave guides may surround one first reinforcement yarn. Likewise, more than one second reinforcement yarn may be present in an assembly.

When a second reinforcement yarn is incorporated, it is common to use the second reinforcement yarn as a core material and helically wind the first reinforcement yarns and the wave guide around the second reinforcement yarn.

The outer sleeve may be placed over one or a plurality of assemblies of step (b). In some designs a number of sleeve covered assemblies are combined into a larger assembly which in turn is also surrounded by a sleeve.

EXAMPLES

For use in the following examples a water-impermeable thermally reversible cross-linked polymer is produced. A Megatron® MT5000 reactor available from Kinematica, Inc., Bohemia, NY is fitted with a device to introduce solids and liquids, the reactor having a high intensity micronizer cell rotating at 16000 RPM, a system for purging with inert gas, a series of temperature probes and a heating and cooling device consisting of a jacket in which a heat transfer fluid is circulated at a targeted temperature. The micronizer is set at a rotation speed of 16000 RPM, and 400 g of a deoxygenated aqueous solution containing about 80% by weight of hydroquinone stabilized acrylic acid is quantitatively neutralized with a 20% sodium hydroxide solution. This is done in a way that the temperature in the micronizer does not exceed 35° C. 5 g of a deoxygenated 1% solution of methylenebisacrylamide, 32 g of a methyacrylate modified Diels-Alder reaction product of furfuryl alcohol and hyrdroxyethyl-functionalized maleimide synthesized as described in J. Mater. Chem., 2007, 17, 3575-3580 are added. Polymerization is initiated with sodium bisulfite/sodium bromate redox pair and the polymerization temperature is regulated so as not to exceed 60° C. After about 30 min, the reactor is heated to 60° C. for 2 hours. The water-impermeable thermally reversible cross-linked polymer is obtained as a fine powder by ultrafiltration.

For use in the following examples, a yarn coated with a coating comprising the water-impermeable thermally reversible cross-linked polymer as described above is produced. A dispersion of 35 weight percent of the water-impermeable thermally reversible cross-linked polymer is prepared in a finish oil as disclosed in U.S. Pat. No. 5,270,113 using a standard laboratory stirrer with a propeller shaped blade. The dispersion is applied on a finish free 110 dtex KEVLAR® type 29 yarn of para-aramid fiber availble from E.I. du Pont de Nemours and Company, Wilmington, Del. (DuPont) using a Masterflex 7523-70 precision pump available from Cole-Parmer, Vernon Hills, IL and a Leeson Model 861 yarn rewinder available from Leesona, Burlington, NC. The coating process results in a coating of 3% water-impermeable thermally reversible cross-linked polymer and 5% finish oil, based on the dry weight of the uncoated yarn.

Example 1

This example is directed towards the production of a fiber optical premise cable containing the coated yarn as described above. A premise cable is a cable comprising a plurality of tight buffered optical fibers and a plurality of loose aramid and/or glass fibers contained within a polymer jacket. A premise fiber optical production line designed by Tensor Fiber Optic Technologies, Hickory, NC is outfitted with a tubular oven after yarn take up. Using this set-up, three coated KEVLAR® yarns are passed through the tubular oven which is at a temperature of 120° C. and is under continuous nitrogen purge. Heat exposure time is approximately 1 minute. After passing through the tubular oven, the three yarns are combined with a waveguide and a polyethylene coating is applied over the yarn-waveguide assembly to form a tight buffered fiber optical premise cable.

The water absorption capability of yarn coatings was evaluated as described below. Ten (10.0) g of the heat treated yarn was cut into non-twisted fibers of approximately 16 cm length. The fibers were immersed in 500 ml distilled water in a 1000 ml beaker. The resulting slurry was stirred manually for 1 min followed by 9 min of immersion with manual stirring every minute. After 10 min, the contents of the beaker were poured into a 20 mesh sieve and the retained fibers allowed to drain for 1 min. The fiber sample was centrifuged for 2 min at 2000 rpm to remove non-bonded water and then weighed to an accuracy of 0.01 g. This is fiber weight A. The fiber sample was then dried to constant weight in a ventilated oven at 105° C. and the weight of the dried fiber sample determined to an accuracy of 0.01 g. This is fiber weight B. The free swelling value of the yarn is calculated from the following equation:

$$\text{Free Swelling Value} = \frac{(A-B) \cdot 100}{B}$$

$$\text{Free Swelling Value} = \frac{(A-B) \cdot 100}{B}$$

Each determination was carried out in triplicate and the results averaged. The yarn showed an average free swelling value of 300.

Comparative Example A

This example is prepared as per Example 1, except that the coated yarn is not passed through a tubular oven. The water absorption capability of yarn coatings was evaluated as described above. The yarn showed an average swelling value of 35.

The nearly ten fold increase in swelling value of Example 1, when compared with Comparative Example A demonstrates the effectiveness of the claimed process.

What is claimed is:

1. A process for forming a fiber optical cable assembly comprising the steps of:
   (a) subjecting a first reinforcement yarn having a linear density of from 150 to 12000 dtex, a tenacity of from 10 to 65 g/dtex, a modulus of from 150 to 2700 g/dtex, and an elongation to break of from 1 to 8 percent coated with a water-impermeable thermally reversible cross-linked polymeric precursor coating to a temperature of from 45 to 200° C. for sufficient time to convert the protective precursor coating via bond cleavage into a water-swellable super absorbent polymer, (b) combining one or more of the first reinforcement yarns from step (a) with one or more optical glass fiber transmission media and (c) applying a protective sleeve over at least one assembly of step (b),
   wherein the precursor coating is a cross-linked polymer comprising reversible covalent bonds capable of bond cleavage under heat.

2. The process of claim 1, wherein at least one second reinforcement yarn may optionally be combined with the first reinforcement yarns and glass fiber transmission media in step (b).

3. The process of claim 1, wherein the polymer of the first reinforcement yarn is selected from the group consisting of p-aramid, polybenzazole, polypyridazole or mixtures thereof.

4. The process of claim 1, wherein the thermally reversible cross-linkers of the thermally reversible coating are present in an amount of from 0.001% to 0.5% weight percent based on the total weight of first reinforcement yarn plus coating.

5. The process of claim 1, wherein the thermally reversible cross-linked coating is present in the amount of from 0.1% to 10% weight percent based on the total weight of the first reinforcement yarn plus coating.

6. The process of claim 3, wherein the p-aramid is poly (paraphenylene terephthalamide).

7. A fiber optic cable made by the process of claim 1.

8. The process of claim 1, wherein the coating comprises a blocked isocyanate, a Diels-Alder reaction product, an azo compound or mixtures thereof.

* * * * *